United States Patent
Hou et al.

(10) Patent No.: US 11,971,649 B2
(45) Date of Patent: Apr. 30, 2024

(54) LIGHT SOURCE DEVICE, PROJECTION APPARATUS AND 3D APPARATUS COMPRISING SAME

(71) Applicant: APPOTRONICS CORPORATION LIMITED, Guangdong (CN)

(72) Inventors: Haixiong Hou, Shenzhen (CN); Mengran Wang, Shenzhen (CN); Yi Li, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 67 days.

(21) Appl. No.: 17/646,813

(22) Filed: Jan. 3, 2022

(65) Prior Publication Data

US 2022/0137497 A1    May 5, 2022

Related U.S. Application Data

(63) Continuation of application No. PCT/CN2020/098515, filed on Jun. 28, 2020.

(30) Foreign Application Priority Data

Jul. 2, 2019    (CN) .................... 201910591571.X (51) Int. Cl.
*G03B 21/20*    (2006.01)
*G02B 30/25*    (2020.01)

(52) U.S. Cl.
CPC .......... *G03B 21/208* (2013.01); *G02B 30/25* (2020.01); *G03B 21/204* (2013.01)

(58) Field of Classification Search
None
See application file for complete search history.

(56) References Cited

U.S. PATENT DOCUMENTS

| 2013/0271730 | A1  | 10/2013 | Lin |
| 2016/0091784 | A1  | 3/2016 | Hu et al. |
| 2018/0292663 | A1* | 10/2018 | Richards ............ G02B 27/0961 |

FOREIGN PATENT DOCUMENTS

| CN | 106324968 | 1/2017 |
| CN | 106444246 | 2/2017 |
| CN | 106569378 | 4/2017 |

(Continued)

OTHER PUBLICATIONS

Office Action issued in corresponding CN Application 201910591571.X and an English Translation, dated Oct. 17, 2022, 15 pages.

(Continued)

*Primary Examiner* — Bao-Luan Q Le
*Assistant Examiner* — Danell L Owens
(74) *Attorney, Agent, or Firm* — Burris Law, PLLC (57) ABSTRACT

Provided is a light source device, including: a laser generation unit configured to output laser light; a light modification element disposed in a light guide unit or between the light guide unit and a homogenizing unit and configured to cause an angular distribution of the laser light uniform and continuous; the light guide unit, configured to receive the laser light output by the laser generation unit and guide the laser light to the homogenizing unit; and the homogenizing unit, configured to receive the laser light from the light guide unit, and homogenize and output the laser light.

12 Claims, 11 Drawing Sheets

(56) References Cited

FOREIGN PATENT DOCUMENTS

| | | |
|---|---|---|
| CN | 108398804 | 8/2018 |
| CN | 109696750 | 4/2019 |
| CN | 109884851 | 6/2019 |
| JP | 2008294108 | 12/2008 |
| WO | 2014135039 | 9/2014 |

OTHER PUBLICATIONS

International Search Report for International Application PCT/CN2020/098515, dated Sep. 28, 2020.
Extended / Supplementary European Search Report issued in corresponding EP Application 20835323.5, dated Jun. 29, 2022.
Office Action issued in corresponding EP Application 20 835 323.5, dated Oct. 13, 2023, 6 pages.

* cited by examiner

LIGHT SOURCE DEVICE, PROJECTION APPARATUS AND 3D APPARATUS COMPRISING SAME

CROSS-REFERENCE TO RELATED APPLICATIONS

The present application is a continuation of International Patent Application No. PCT/CN2020/098515, filed on Jun. 28, 2020, which claims priority to Chinese Patent Application No. 201910591571.X, filed on Jul. 2, 2019, the contents of both of which are incorporated herein by reference in their entireties.

TECHNICAL FIELD

The present disclosure relates to the technical field of laser projection, and in particular, to a light source device, a projection apparatus and a 3D apparatus having the same.

BACKGROUND

In a 3D projection apparatus using laser light as a light source, the polarization 3D technology is adopted. The main principle is to convert non-polarized light exited from a lens of the projection apparatus into linearly polarized light by using a linear polarization device. The linearly polarized light is sequentially converted into left-handed circularly polarized light and right-handed circularly polarized light by using a liquid crystal phase modulation device according to a frame sequence. Based on the types of linear polarization device, the polarization 3D technology can be classified into: single-optical-path 3D, dual-optical-path 3D, and three-optical-path 3D. The dual-optical-path and three-optical-path 3D technologies are the major 3D projection technology types used in theaters due to their higher light efficiency.

However, conventional methods may bring high requirements on the production technology of the projection apparatus, which increases the production and usage costs of the projection apparatus.

SUMMARY

The present disclosure provides a light source device, a projection apparatus and a 3D apparatus including the light source device, to solve the problem that diffraction fringes are easily generated in a laser 3D projection apparatus.

To solve the above technical problems, the technical solution adopted by the present disclosure is: a laser generation unit configured to output laser light; a light modification element disposed in a light guide unit or between the light guide unit and a homogenizing unit and configured to cause an angular distribution of the laser light uniform and continuous; the light guide unit, configured to receive the laser light output by the laser generation unit and guide the laser light to the homogenizing unit; and the homogenizing unit, configured to receive the laser light from the light guide unit, and homogenize and output the laser light.

The present disclosure provides a projection apparatus, including the light source device described above and an opto-mechanical device, the opto-mechanical device includes at least one lens and is configured to receive a homogeneous light from the light source device, process the homogeneous light through the lens, and then output the homogeneous light.

The present disclosure further provides a 3D apparatus, including the projection apparatus described above; and a polarizing and splitting device including a prism unit and a lens assembly, and is configured to convert light emitted from the projection apparatus into polarized light through the prism unit and the lens assembly, and project the polarized light on a screen.

DESCRIPTION OF EMBODIMENTS

The present disclosure will be described in detail below in conjunction with the accompanying drawings and embodiments.

Figure 1:
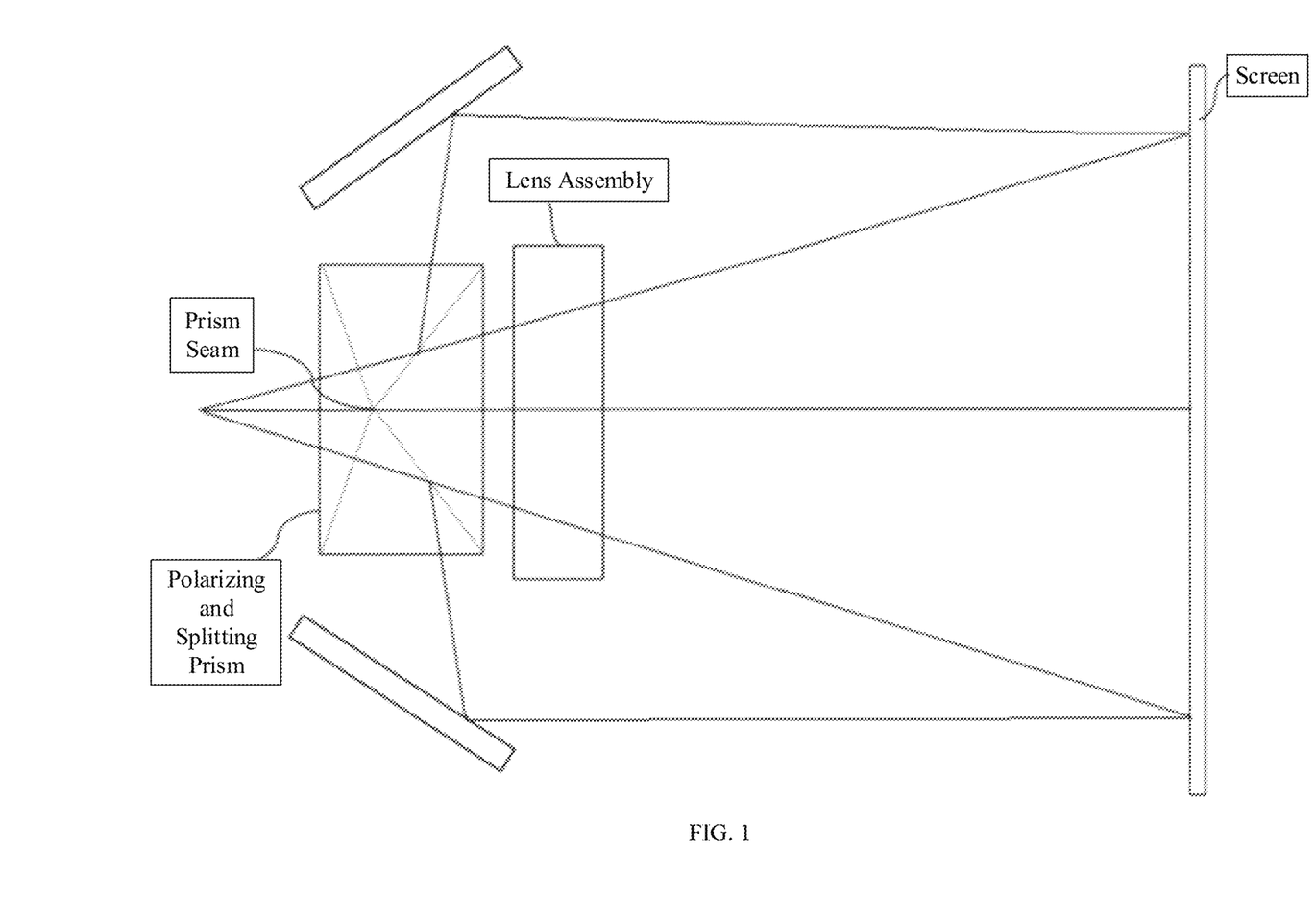
FIG. 1 is a schematic structural diagram of a diffraction principle of a 3D projection technology.

FIG. 1 is a schematic structural diagram of a diffraction principle of a 3D projection technology. Since laser light is a coherent light source with good coherence, the laser light may have a diffraction phenomenon at a prism seam of a polarizing and splitting prism in a 3D projection apparatus. The polarizing and splitting prism in the 3D projection apparatus is generally formed by three or four prisms spliced together, and therefore, a prism seam will be formed on the optical axis. Depending on the accuracy of the production process, the prism seam may cause the diffraction effect of incident laser light, resulting in horizontal color fringes in the middle of the screen. Laser light emitted from the light source is further homogenized by a light bar of the projection apparatus, but the continuity of laser angular distribution per unit area is not significantly improved. The angular distribution of the beam is no longer changed by the relay lens, prism, digital mirror device (DMD), lens, or the like on the optical path of the projection apparatus. Therefore, light emitted from the lens is light with a discontinuous angular distribution at a light output end of the light bar of the projection apparatus.

Figure 2:
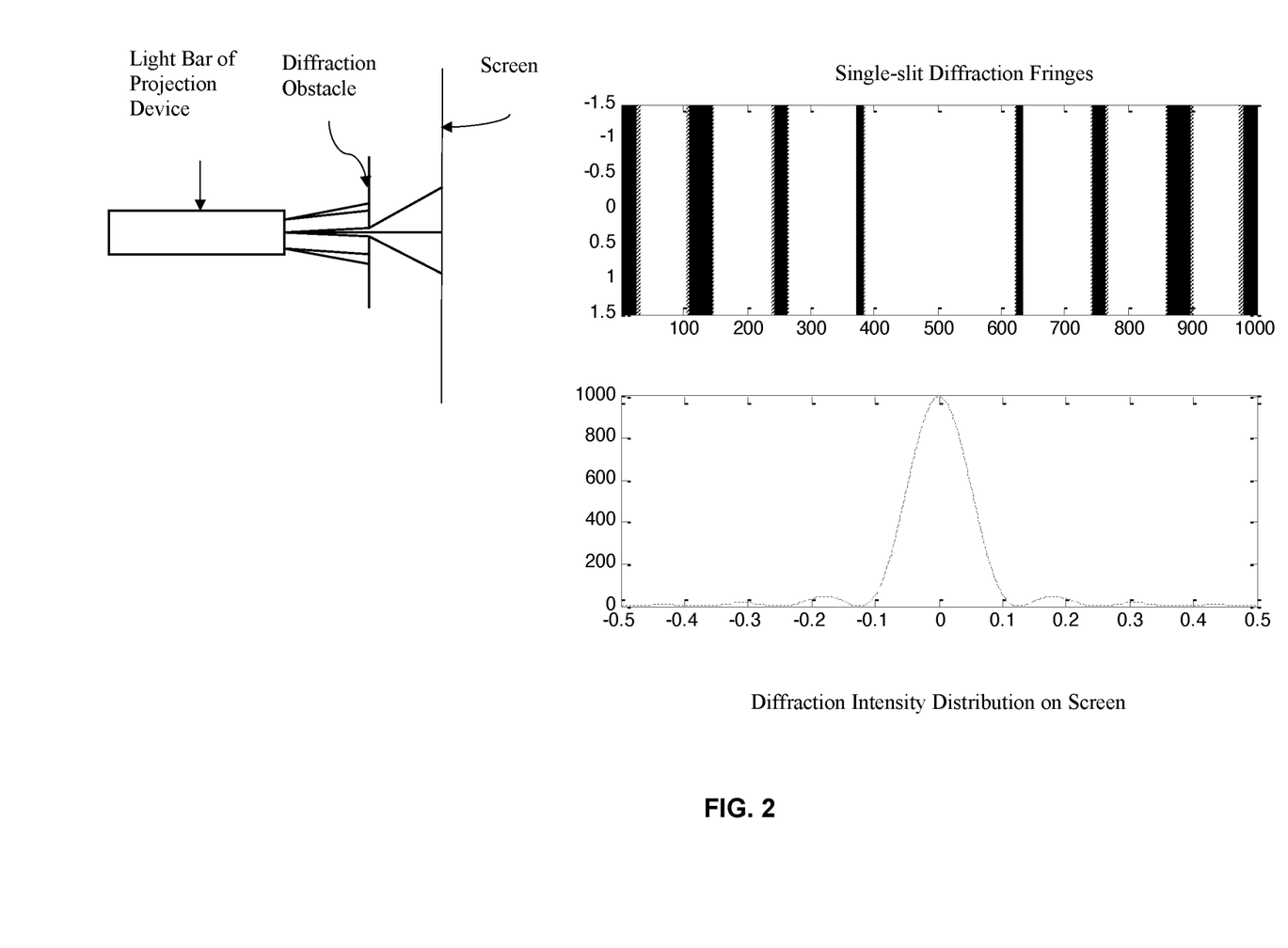
FIG. 2 is a schematic diagram of a diffraction effect of a 3D projection technology.

FIG. 2 is a schematic diagram of a diffraction effect of a 3D projection technology. When a 3D movie is played, only a small part in the middle of the whole beam is illuminated on the diffraction obstacle (prism seam) of the three-optical-path 3D projection apparatus, thus forming clear diffraction fringes on the screen to affect the projection viewing effect.

At present, the intensity of color fringes can be reduced by special treatment on the prism edge and optimization of the prism gluing and splicing process. This method may bring high requirements on the production technology of the projection apparatus, which increases the production and usage costs of the projection apparatus.

Figure 3:
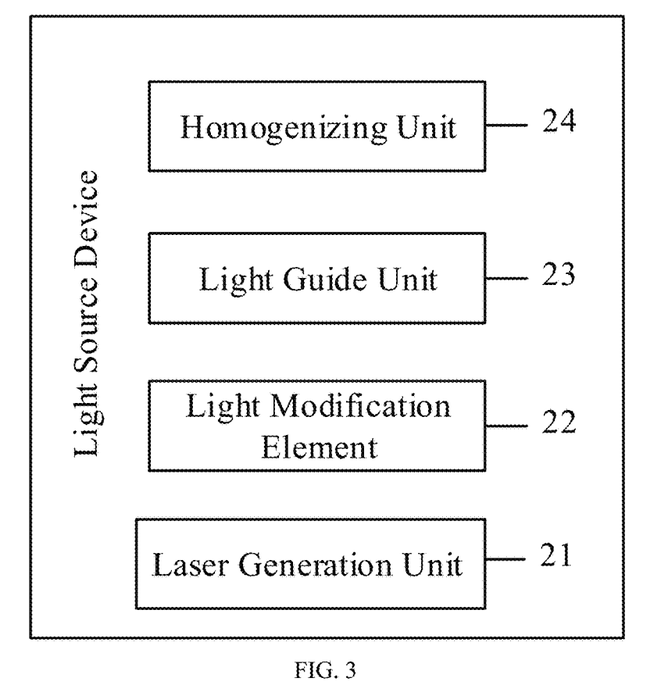
FIG. 3 is a schematic structural diagram of a light source device according to the present disclosure.

FIG. 3 is a schematic structural diagram of a light source device according to the present disclosure. The light source device includes a laser generation unit 21, configured to output laser light; a light modification element 22, configured to cause an angular distribution of the laser light uniform and continuous; a light guide unit 23, configured to receive the laser light output by the laser generation unit and guide the laser light to a homogenizing unit; and the homogenizing unit 24, configured to receive the laser light from the light guide unit 23, and homogenize and output the laser light.

Figure 4:
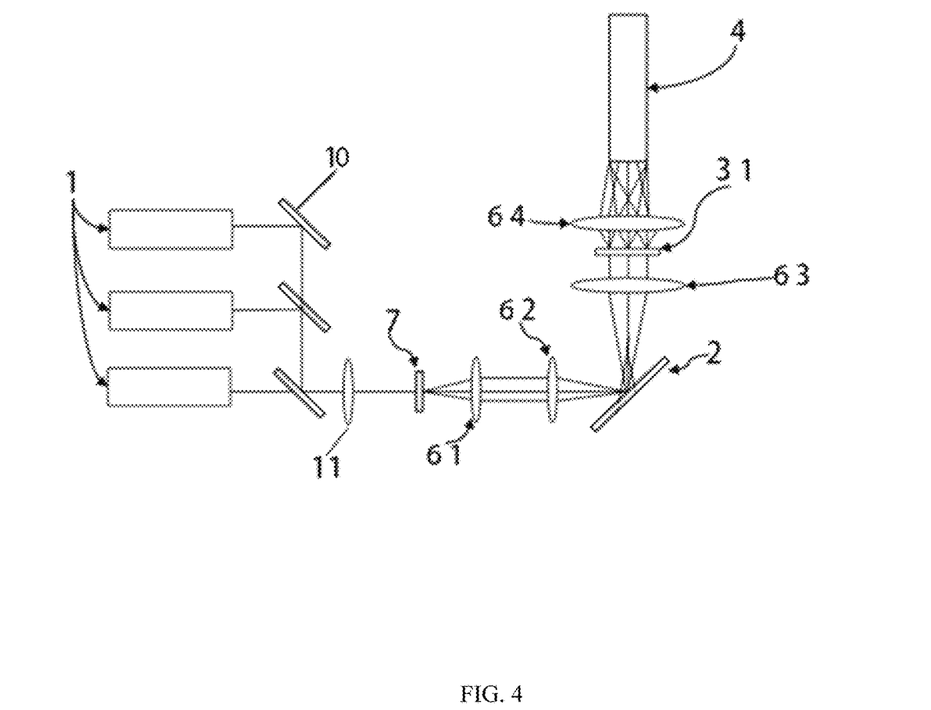
FIG. 4 is a schematic structural diagram of Embodiment 1 of a light source device according to the present disclosure.
Figure 12:
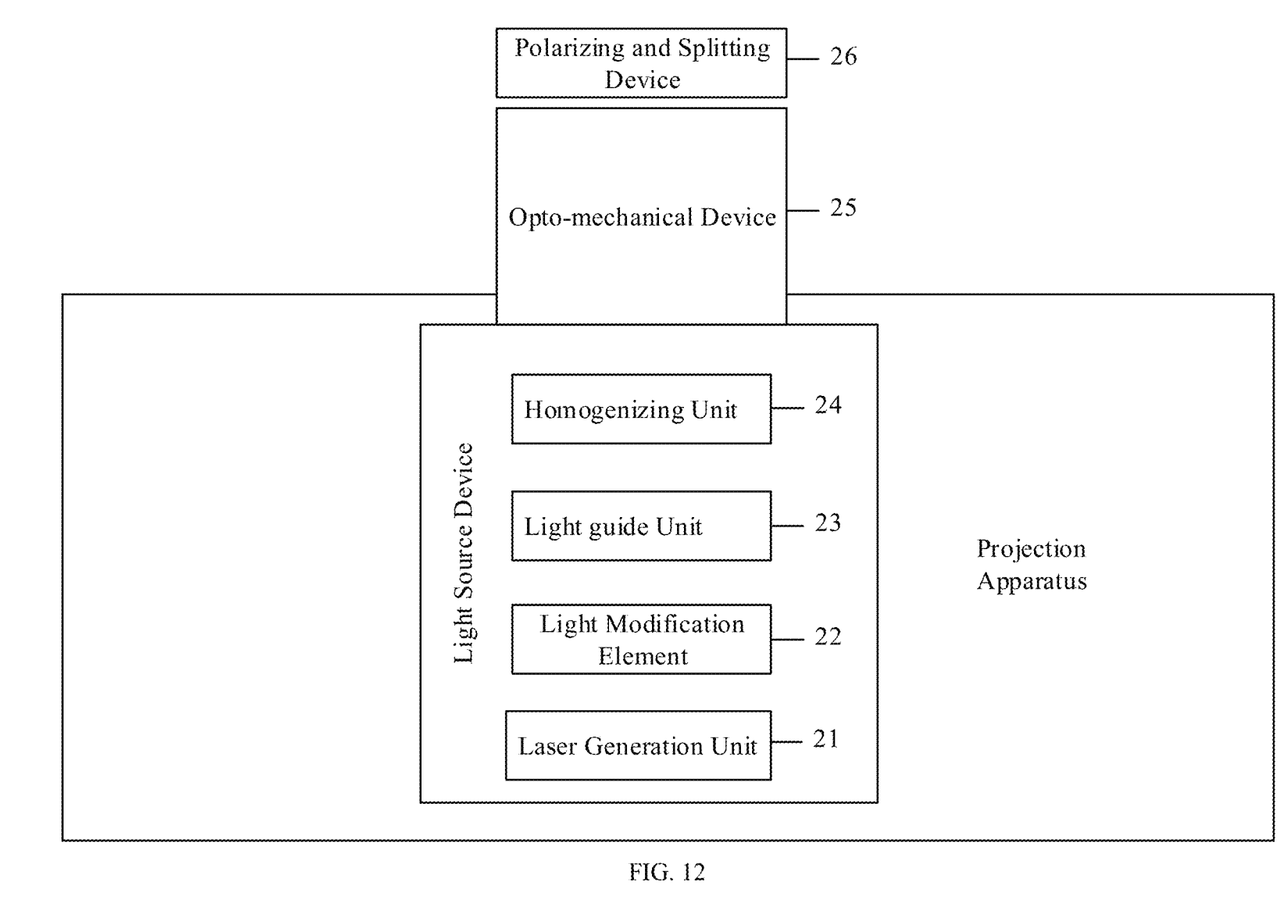
FIG. 12 is a schematic structural diagram of a 3D apparatus according to the present disclosure.

FIG. 4 is a schematic structural diagram of Embodiment 1 of a light source device according to the present disclosure. FIG. 12 is a schematic structural diagram of a 3D apparatus according to the present disclosure. The laser generation unit 21 includes a plurality of primary color lasers 1. The primary color lasers 1 include a red laser for emitting red laser light, a green laser for emitting green laser light, and a blue laser for emitting blue laser. Laser light emitted from the plurality of primary color lasers is combined by a light combining lens 10 and then output to the light guide unit 23. The light guide unit 23 includes a first focusing lens 11, a scattering wheel 7, a first relay lens 61, a second relay lens 62, a light guide element 2, a third relay lens 63, and a fourth relay lens 64. The light modification element 22 is disposed between the third relay lens 63 and the fourth relay lens 64. The first focusing lens 11 is configured to gather the laser light guided from the light combining lens 10. Light scattered by the scattering wheel 7 sequentially passes through the first relay lens 61, the second relay lens 62, the light guide element 2, the third relay lens 63, the light modification element 22, and the fourth relay lens 64, then enters the homogenizing unit 24 through a light incident surface of the homogenizing unit 24, and is output after being homogenized.

In this embodiment, the light modification element 22 is a scattering sheet 31, and the homogenizing unit 24 is a light bar 4. In other embodiments, the light modification element 22 may also be other types of elements, such as a fly-eye lens assembly 32, which is not specifically limited herein, as long as it can modify the optical angle of the laser light to make the angular distribution uniform and continuous.

Figure 5:
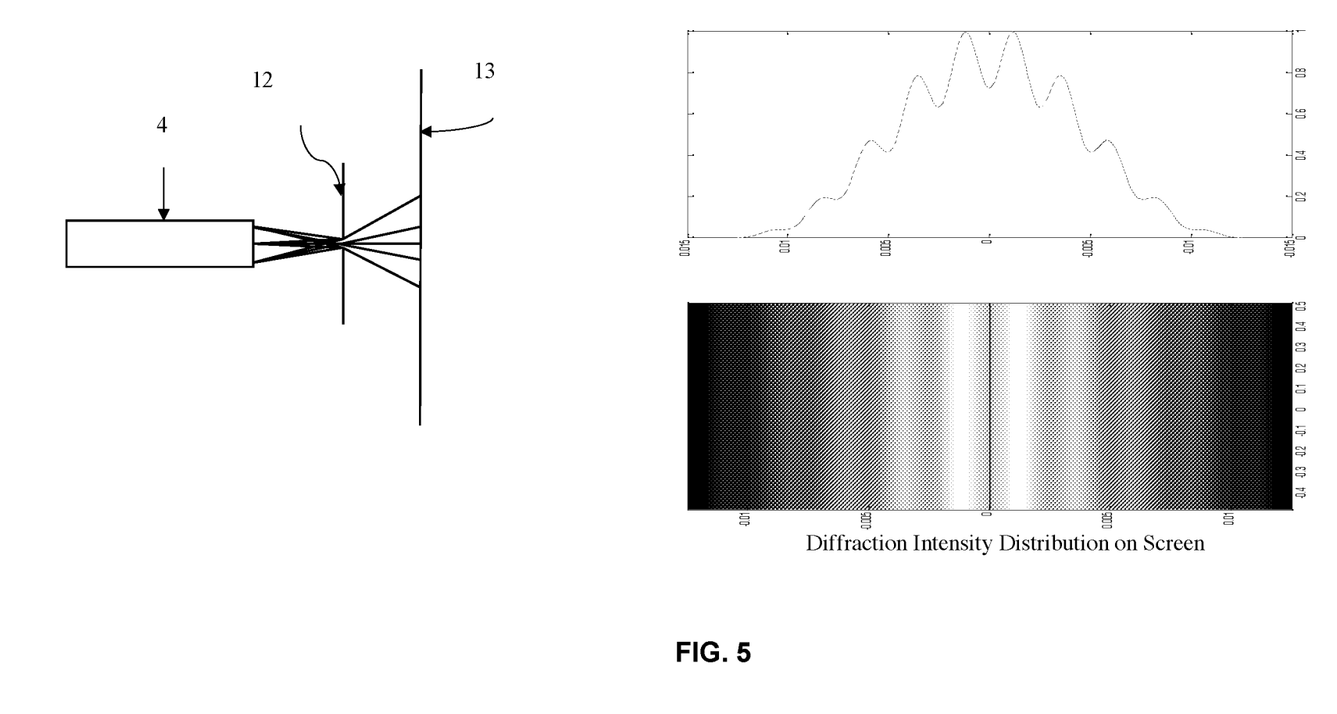
FIG. 5 is a schematic diagram of a principle of eliminating diffraction fringes according to the present disclosure.

The laser light emitted from the third relay lens 63 has a continuous planar distribution, while the angular distribution is non-uniform and discontinuous. The beam is incident on the scattering sheet 31, and is output after the angle of the beam is expanded by the scattering sheet 31. The scattering sheet 31 mainly achieves the effect of improving the angular distribution of the laser. When each scattered beam is gathered by the fourth relay lens 64 and then enters the light bar 4, the small beams which are originally separated from each other spatially intersect each other because the divergence angles thereof are expanded by the scattering sheet 31. Each laser light generates a relatively large light spot on an entry surface of the light bar 4, and the light spots overlap with each other, so that each point on the entry surface of the light bar 4 receives light from a larger angle range compared with the case without the scattering sheet 31. FIG. 5 is a schematic diagram of a principle of eliminating diffraction fringes according to the present disclosure. Since the light bar 4 homogenizes the beam without changing the angle of the beam, light emitted from each point on an exit surface of the light bar 4 also has a larger angle as compared with the case without the scattering sheet 31. Therefore, when the laser light passes through the opto-mechanical device, there will be more light at different angles irradiated on a seam formed between prisms of the polarizing and splitting device 26. After beams at different incident angles pass through the prism seam 12, generated diffraction fringes spatially overlap with each other, so that the overall resolution of the fringes on a screen 13 is reduced. By adjusting the scattering angle and scattering form of the scattering sheet 31, the resolution of the fringes can be reduced to a level that is unrecognizable to human eyes.

This embodiment can use a hybrid light source consisting of the laser generation unit 21 and an LED light source. The embodiments below are also applicable to the hybrid light source consisting of the laser generation unit 21 and the LED light source. Details are not repeated herein.

Figure 6:
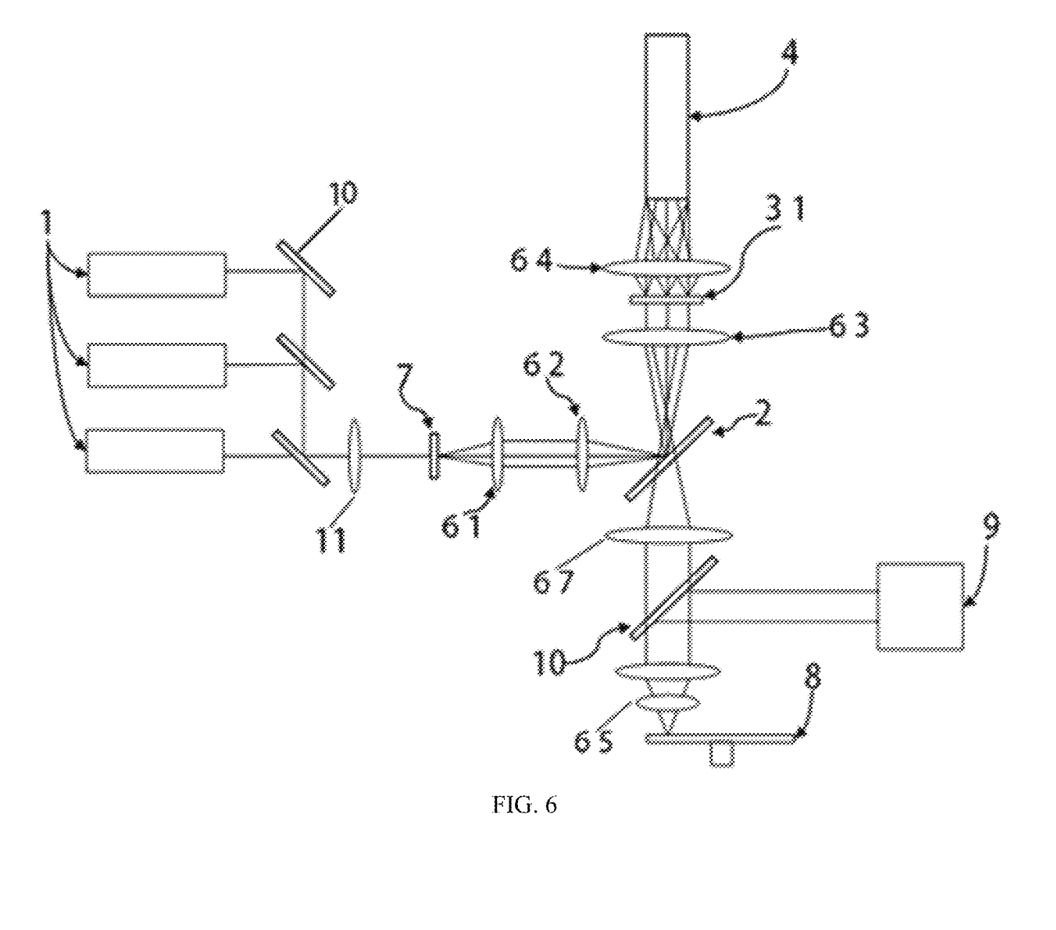
FIG. 6 is a schematic structural diagram of Embodiment 2 of a light source device according to the present disclosure.

FIG. 6 is a schematic structural diagram of Embodiment 2 of a light source device according to the present disclosure. FIG. 12 is a schematic structural diagram of a 3D apparatus according to the present disclosure. The light source device in this embodiment is different from the Embodiment 1 in further including a fluorescence generation unit. The fluorescence generation unit includes a laser 9 configured to generate laser light to excite fluorescence, a dichroic filter 10, a fluorescent wheel 8, a collection lens assembly 65, and a second focusing lens 67. The dichroic filter 10 reflects laser light to be irradiated on the fluorescent wheel 8. The fluorescent wheel 8 absorbs the laser light and generates fluorescence, which is transferred through the collection lens assembly 65, the dichroic filter 10, and the second focusing lens 67 to the light guide element 2, passes through the light guide element 2, and is combined with laser light to output a hybrid beam. A scattering sheet 31 with a particular angle is disposed between the third relay lens 63 and the fourth relay lens 64 of the light guide unit 23. In the hybrid beam emitted from the light guide element 2, the laser light has a continuous planar distribution but a discontinuous angular distribution. The hybrid beam is incident on the scattering sheet 31 through the third relay lens 63, and is output after the angle is expanded by the scattering sheet 31. The scattering sheet 31 mainly achieves an effect of improving the angular distribution of the laser light, while hardly changing an angular distribution of the fluorescence. When the laser light in each scattered hybrid beam is gathered by the fourth relay lens 64 and then enters the light bar 4, the laser light in the small hybrid beams which are originally separated from each other spatially intersect each other since the divergence angles are expanded by the scattering sheet 31. Each laser light generates a relatively large light spot on an entry surface of the light bar 4, and the light spots overlap with each other, so that each point on the entry surface of the light bar 4 receives light from a larger angle range compared with the case without the scattering sheet 31. FIG. 5 is a schematic diagram of a principle of eliminating diffraction fringes according to the present disclosure. Since the light bar 4 homogenizes the beam without changing the angle of the beam, light emitted from each point on a light output end of the light bar 4 also has a larger angle as compared with the case without the scattering sheet 31. Therefore, when the laser light passes through the opto-mechanical device 25, there will be more light at different angles irradiated on a seam formed between prisms of the polarizing and splitting device 26. After beams at different incident angles pass through the prism seam 12, generated diffraction fringes spatially overlap with each other, so that the overall resolution of the fringes on the screen 13 is reduced. By adjusting the scattering angle and scattering form of the scattering sheet 31, the resolution of the fringes can be reduced to a level that is unrecognizable to human eyes.

Figure 7:
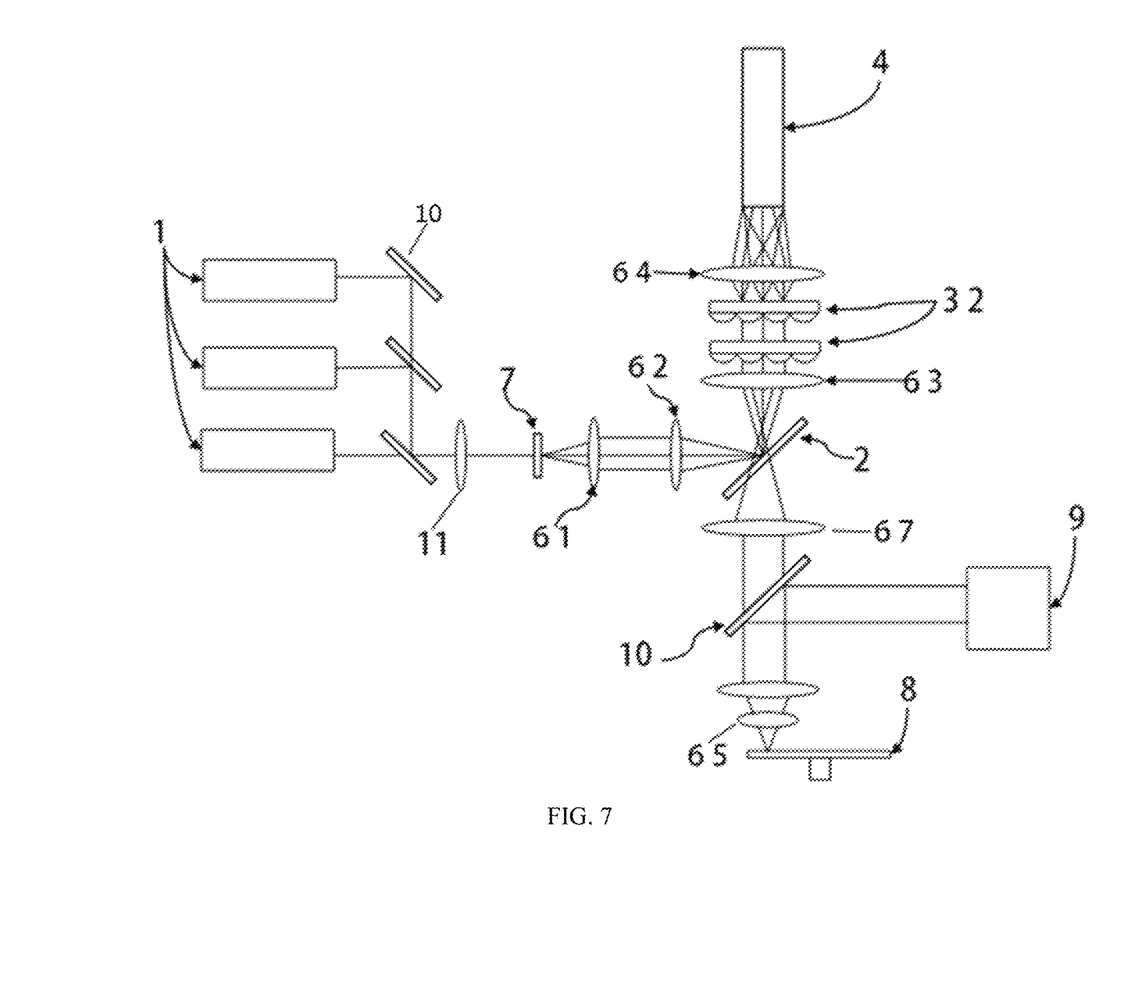
FIG. 7 is a schematic structural diagram of Embodiment 3 of a light source device according to the present disclosure.

FIG. 7 is a schematic structural diagram of Embodiment 3 of a light source device according to the present disclosure. FIG. 12 is a schematic structural diagram of a 3D apparatus according to the present disclosure. This embodiment is different from Embodiment 2 in that, a fly-eye lens assembly 32 is used in this embodiment to replace the scattering sheet 31. Both the fly-eye lens assembly 32 and the scattering sheet 31 have the effect of widening the angle of emission of the fine beam. The first row of lenses in the first row in the fly-eye lens assembly 32 splits the entire hybrid beam into multiple fine beams, the second row of lenses located at the focal point of the first row of lenses images each fine hybrid beam in the same area, and the hybrid beams are superimposed on each other to improve the uniformity of the laser light angle.

All laser light in the hybrid beam emitted from the light guide element 2 will be completely imaged on the light bar 4 after passing through the fly-eye lens assembly 32 and the fourth relay lens 64. That is, each small region on the light bar 4 will receive a small part of the laser light in the whole hybrid beam. The fly-eye lens assembly 32 achieves the same effect as the scattering sheet 31 in Embodiment 2, and reduces the spatial coherence of laser. FIG. 5 is a schematic diagram of a principle of eliminating diffraction fringes according to the present disclosure. Light emitted from each point at a light output end of the light bar 4 also has a larger angle as compared with the case without the fly-eye lens assembly 32. Therefore, after the laser light passes through the opto-mechanical device 25, light from more different angles will be irradiated on the seam formed between the prisms of the polarizing and splitting device 26. After beams at different incident angles pass through the prism seam 12, generated diffraction fringes spatially overlap with each other, so that the overall resolution of fringes on the screen 13 is reduced. The positions and optical parameters of the fly-eye lens assembly 32 and the fourth relay lens 64 are adjusted, so that focal spots fill the light incident end of the light bar 4 as much as possible, thereby obtaining an optimal diffraction fringe elimination effect. Moreover, in Embodiment 3, a light modification element 22 may also be added in front of the light bar 4. The light modification element 22 herein may be a fly-eye lens assembly 32 or a scattering sheet 31, to further improve the angular distribution of the laser light, expand the angle of the laser light, and enhance the homogenizing effect of the light bar 4, thereby weakening the diffraction fringe phenomenon of the laser light on the screen 13.

Figure 8:
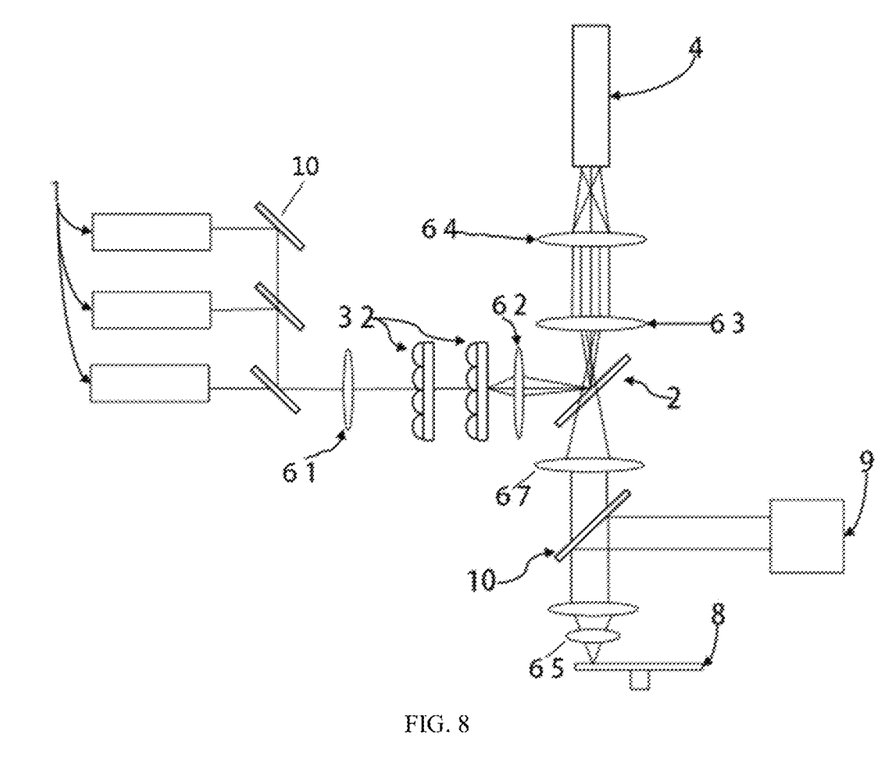
FIG. 8 is a schematic structural diagram of Embodiment 4 of a light source device according to the present disclosure.

FIG. 8 is a schematic structural diagram of Embodiment 4 of a light source device according to the present disclosure. FIG. 12 is a schematic structural diagram of a 3D apparatus according to the present disclosure. This embodiment is different from Embodiment 3 in that, the fly-eye lens assembly 32 is located between the first relay lens 61 and the second relay lens 62. The diffusion wheel 7 and the first focusing lens 11 are omitted. The first relay lens 61, which is originally an aspheric lens, is replaced by a spherical lens with a small curvature to collimate pure laser light, thereby reducing the manufacturing costs and difficulty of the light source. In other words, the fly-eye lens assembly 32 is moved to a pure laser optical path, so that the fly-eye lens assembly 32 in the light guide unit 23 only improves the angular distribution of pure laser light that generates diffraction fringes, thereby avoiding influence on fluorescence, and the efficiency of the fluorescence entering the light bar 4 is not affected during diffraction fringe elimination. The fly-eye lens assembly 32 in Embodiment 4 achieves the same effect as the fly-eye lens assembly 32 in Embodiment 3, and reduces the spatial coherence of laser light. FIG. 5 is a schematic diagram of a principle of eliminating diffraction fringes according to the present disclosure. Light emitted from each point at a light output end of the light bar 4 also has a larger angle as compared with the case without the fly-eye lens assembly 32. Therefore, after the laser light passes through the opto-mechanical device 25, light from more different angles will be irradiated on the seam formed between the prisms of the polarizing and splitting device 26. After beams at different incident angles pass through the prism seam 12, generated diffraction fringes spatially overlap with each other, so that the overall resolution of fringes on the screen 13 is reduced. The positions and optical parameters of the fly-eye lens assembly 32 and the second relay lens 62 are adjusted, so that focal spots fill the entry of the light bar 4 as much as possible, thereby obtaining an optimal diffraction fringe elimination effect.

Figure 9:
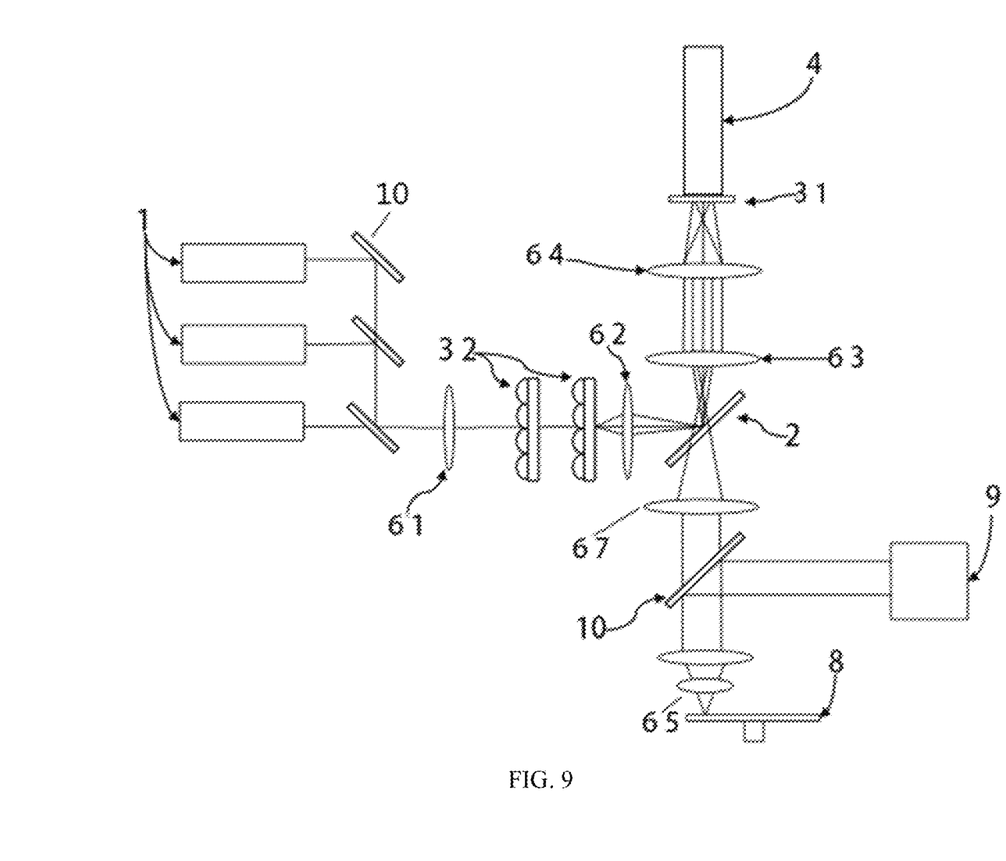
FIG. 9 is a schematic structural diagram of Embodiment 5 of a light source device according to the present disclosure.

FIG. 9 is a schematic structural diagram of Embodiment 5 of a light source device according to the present disclosure. FIG. 12 is a schematic structural diagram of a 3D apparatus according to the present disclosure. This embodiment is different from Embodiment 4 in that, on the basis of Embodiment 4, a scattering sheet 31 is disposed in front of the light bar 4 of the homogenizing unit 24. Such an arrangement alleviates the problem that the laser light from the laser generation unit 21 is only homogenized by the fly-eye lens assembly 32 and has a poor angular distribution. FIG. 5 is a schematic diagram of a principle of eliminating diffraction fringes according to the present disclosure. By adding the scattering sheet 31 in front of the light bar 4, the angular distribution of the laser light is further improved, the angle of the laser light is expanded, and the homogenizing effect of the projection apparatus light bar 4 is enhanced, thereby weakening the diffraction fringe phenomenon of the laser light on the screen 13.

Figure 10:
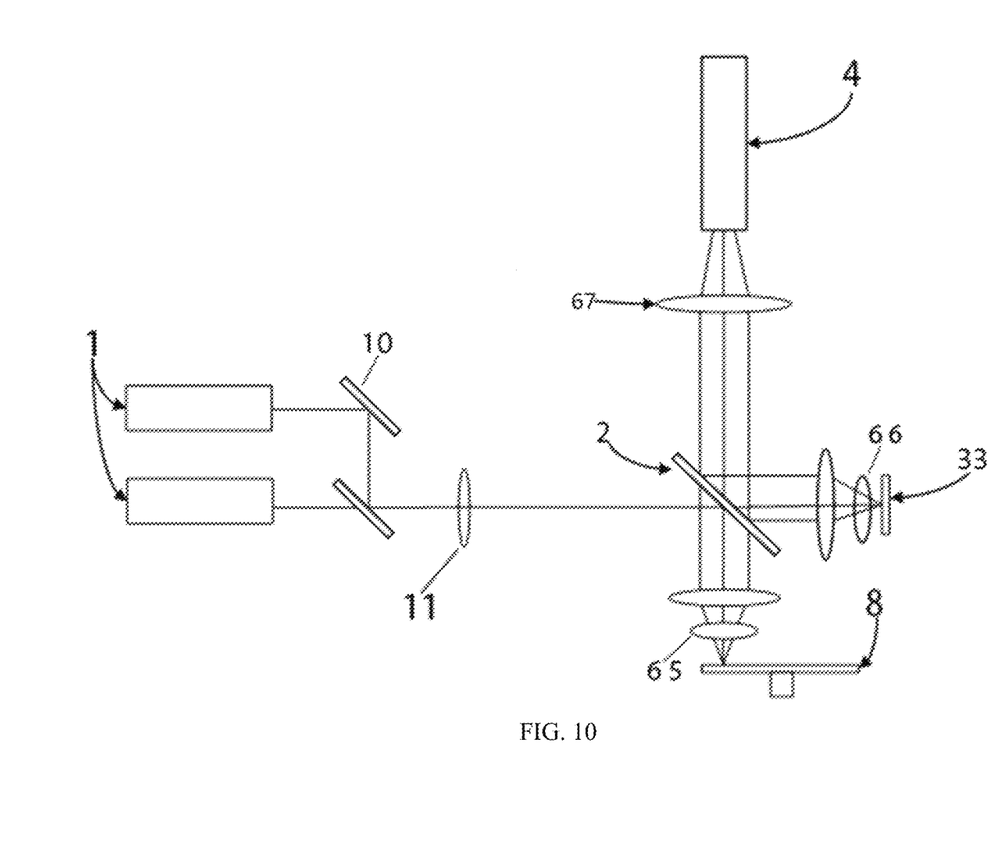
FIG. 10 is a schematic structural diagram of Embodiment 6 of a light source device according to the present disclosure.

FIG. 10 is a schematic structural diagram of Embodiment 6 of a light source device according to the present disclosure. FIG. 12 is a schematic structural diagram of a 3D apparatus according to the present disclosure. The laser generation unit 21 in this embodiment includes a plurality of primary color lasers 1. The primary color lasers 1 include a red laser for emitting red laser light and a blue laser for emitting blue laser light. Laser light emitted from the plurality of primary color lasers is combined by the light combining lens 10 and then transmitted to the light guide unit 23. The light guide unit 23 includes a first focusing lens 11, a light guide element 2, a second focusing lens 67, and a collection lens assembly 66. The fluorescence generation unit includes a fluorescent wheel 8 and a collection lens assembly 65. The light guide unit 23 transfers the hybrid beam to the homogenizing unit 24. In this case, the laser generation unit 21 not only generates laser light for the laser generation unit but also generates laser light for the fluorescence generation unit.

In this embodiment, the light modification element 22 is a scattering beet diffuse reflective sheet 33, which is disposed on a light propagation path of the collection lens assembly 66 of the light guide unit 23. The homogenizing unit 24 is a light bar 4. The light guide element 2 is a regional film.

Laser light emitted from the primary color lasers 1 is gathered by the light combining lens 10 and the first focusing lens 11, and then transmitted to the light guide element 2 formed by the regional film. A central region of the regional film allows one type of laser light to pass and reflects another type of laser light. For example, the central region allows blue laser light to pass and reflects red laser light. A peripheral region reflects blue laser light and allows yellow fluorescence to pass. Laser light reflected by the regional film is transferred to the fluorescent wheel 8. The entire phosphor section on the fluorescent wheel 8 is a yellow phosphor section. Therefore, fluorescence generated by the fluorescent wheel 8 is yellow fluorescence, so that the yellow fluorescence passes through the peripheral region of the regional film. Red laser light is guided to the yellow phosphor section through the regional film. The wavelength of the red laser light is not converted, but the laser light will be dispersed, and the angular distribution will become continuous. Therefore, the red laser light will also pass through the peripheral region of the regional film. Laser light passing through the center of the regional film is transmitted to the diffuse reflective sheet 33 through the collection lens assembly 66. The scattering sheet 31 and the fly-eye lens assembly 32, the diffuse reflective sheet 33 can also achieve the effects of expanding the angle of the laser light and reducing the spatial coherence. Laser light reflected by the diffuse reflective sheet 33 is transmitted through the collection lens assembly 66 again to the regional film, to be combined with the fluorescence to form a hybrid beam, which is transferred to the second focusing lens 67 and transmitted to the light incident end of the light bar 4. FIG. 5 is a schematic diagram of a principle of eliminating diffraction fringes according to the present disclosure. Light emitted from each point at the light output end of the light bar 4 has a larger angle. Therefore, after the laser light passes through the opto-mechanical device 25, light from more different angles will be irradiated on the seam 12 formed between the prisms of the polarizing and splitting device 26. After beams at different incident angles pass through the prism seam 12, generated diffraction fringes spatially overlap with each other, so that the overall resolution of fringes on the screen 13 is reduced. The positions and optical parameters of the diffuse reflective sheet 33 and the light guide element 2 are adjusted, so that focal spots fill the entry of the light bar 4 as much as possible, thereby obtaining an optimal diffraction fringe elimination effect.

In any of the foregoing embodiments, the element type and arrangement position of the light modification element 22 can be selected according to specific requirements, and are not limited to the situation described in the embodiments of the present disclosure.

Figure 11:
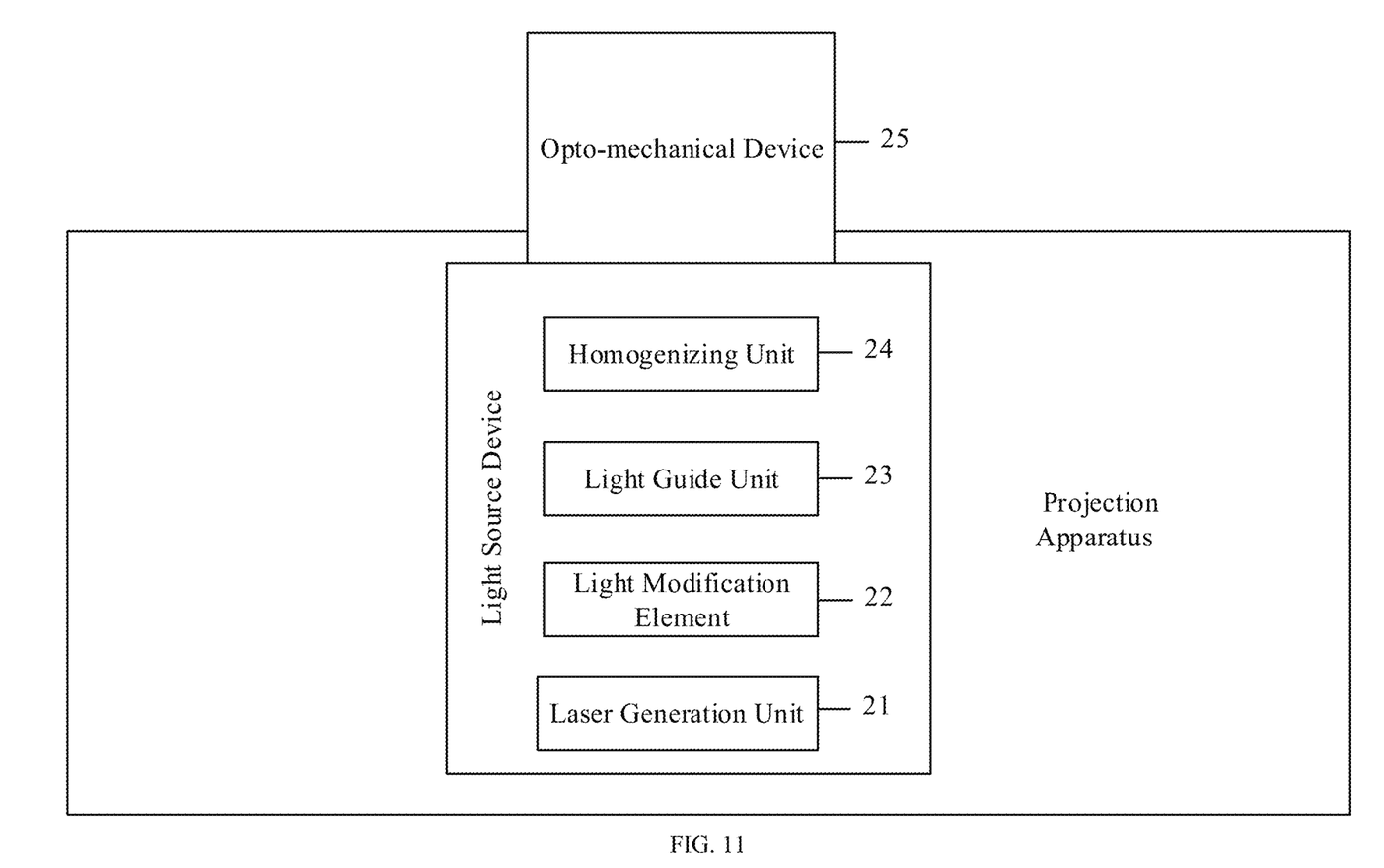
FIG. 11 is a schematic structural diagram of a projection apparatus according to the present disclosure.

FIG. 11 is a schematic structural diagram of a projection apparatus according to the present disclosure. The projection apparatus includes a light source device described in any of the foregoing embodiments, and an opto-mechanical device 25. The opto-mechanical device 25 includes at least one lens and is configured to receive a homogeneous light from the light source device, process the homogeneous light through the lens, and then output the beam. Other components and functions of the opto-mechanical device 25 and the projection apparatus are the same as those in the related art, and details are not described herein again.

FIG. 12 is a schematic structural diagram of a 3D apparatus according to the present disclosure. The 3D apparatus includes the projection apparatus described above and a polarizing and splitting device 26. The polarizing and splitting device 26 includes a prism unit and a lens assembly, and is configured to convert a beam emitted from the projection apparatus into polarized light through the prism unit and the lens assembly, and project the polarized light on a screen. Other components and functions of the polarizing and splitting device 26 and the 3D apparatus are the same as those in the related art, and details are not described herein again.

In the present disclosure, the light modification element has the effects of reducing the spatial coherence of the laser light and making an angular distribution of the laser light uniform and continuous, so that the diffraction phenomenon produced by the laser light, which is emitted from the light source device, irradiated on the prism seam of the polarizing and splitting prism in the 3D apparatus is weakened, which greatly improves the viewing effect for users.

The above described are merely implementations of the present disclosure, which do not constitute limitations on the scope of the present patent application. Any equivalent structure or equivalent process change made based on the description and drawings of the present disclosure, or direct or indirect application thereof in other related technical fields, should still fall in the protection scope of the patent of the present disclosure.

What is claimed is:

1. A light source device, comprising:
a laser generation unit configured to output laser light;
a light modification element disposed in a light guide unit or between the light guide unit and a homogenizing unit, and configured to cause an angular distribution of the laser light uniform and continuous;
the light guide unit, configured to receive the laser light output by the laser generation unit and guide the laser light to the homogenizing unit; and
the homogenizing unit, configured to receive the laser light from the light guide unit, and homogenize and output the laser light;
wherein the light guide unit comprises a third relay lens and a fourth relay lens, the light modification element is disposed between the third relay lens and the fourth relay lens, and the third relay lens, the light modification element, and the fourth relay lens are arranged in sequence and close to a light incident end of the homogenizing unit.

2. The light source device according to claim 1, wherein the light incident end of the homogenizing unit comprises a further light modification element.

3. The light source device according to claim 2, wherein each of the light modification element and the further light modification element is at least one of a fly-eye lens assembly, a scattering sheet or combinations thereof.

4. The light source device according to claim 1, wherein the light guide unit comprises a light guide element and a focusing lens, the light guide element is disposed between a light output end of the laser generation unit and the light modification element, and the focusing lens is disposed between the light guide element and a light incident end of the homogenizing unit.

5. The light source device according to claim 4, wherein the light modification element is a diffuse reflective sheet, and the light guide element is a regional film.

6. The light source device according to claim 1, further comprising a fluorescence generation unit configured to output fluorescence, wherein the fluorescence and the laser light output by the laser generation unit are combined and then homogenized by the homogenizing unit.

7. A light source device, comprising:
a laser generation unit configured to output laser light;
a light modification element disposed in a light guide unit or between the light guide unit and a homogenizing unit, and configured to cause an angular distribution of the laser light uniform and continuous;

the light guide unit, configured to receive the laser light output by the laser generation unit and guide the laser light to the homogenizing unit; and the homogenizing unit, configured to receive the laser light from the light guide unit, and homogenize and output the laser light;

wherein the light guide unit comprises a first relay lens and a second relay lens, the light modification element is disposed between the first relay lens and the second relay lens; and the first relay lens, the light modification element, and the second relay lens are arranged in sequence and close to a light output end of the laser generation unit;

wherein the light incident end of the homogenizing unit comprises a further light modification element.

8. The light source device according to claim 7, wherein each of the light modification element and the further light modification element is at least one of a fly-eye lens assembly, a scattering sheet or combinations thereof.

9. The light source device according to claim 7, wherein the light guide unit comprises a light guide element and a focusing lens, the light guide element is disposed between a light output end of the laser generation unit and the light modification element, and the focusing lens is disposed between the light guide element and a light incident end of the homozenizing unit.

10. The light source device according to claim 9, wherein the light modification element is a diffuse reflective sheet, and the light guide element is a regional film.

11. The light source device according to claim 7, further comprising a fluorscence generation unit configured to output fluorescence, wherein the fluorescence and the laser light output by the laser generation unit are combined and then homogenized by the homogenizing unit.

12. A 3D apparatus, comprising a projection apparatus and a polarizing and splitting device, wherein the polarizing and splitting device comprises a prism unit and a lens assembly, and is configured to convert light emitted from the projection apparatus into polarized light through the prism unit and the lens assembly, and project the polarized light on a screen, wherein the projection apparatus comprises:

a light source device and an opto-mechanical device, wherein the opto-mechanical device comprises at least one lens and is configured to receive homogeneous light from the light source device, process the homogeneous light through the lens, and then output the homogeneous light, wherein the light source device comprises:

a laser generation unit configured to output laser light;

a light modification element disposed in a light guide unit or between the light guide unit and a homogenizing unit and configured to cause an angular distribution of the laser light uniform and continuous;

the light guide unit, configured to receive the laser light output by the laser generation unit and guide the laser light to the homogenizing unit; and the homogenizing unit, configured to receive the laser light from the light guide unit, and homogenize and output the laser light.

* * * * *